3,759,882
PROCESS FOR PREPARING RANDOM HIGH CIS-SBR
Walter Nudenberg, West Caldwell, and Edward A. Delaney, Dover, N.J., assignors to Uniroyal, Inc., New York, N.Y.
No Drawing. Filed June 22, 1971, Ser. No. 155,619
Int. Cl. C08d 1/22, 1/44, 3/04
U.S. Cl. 260—84.1                                                6 Claims

ABSTRACT OF THE DISCLOSURE

A process for preparing a rubbery copolymer of butadiene and styrene wherein at least 50% of the butadiene units are in the cis-1,4 configuration and which contains from 10 to 45% by weight of bound styrene, the bound styrene having random distribution, which comprises polymerizing monomeric butadiene and monomeric styrene in solution in an inert organic solvent with an iodine-containing catalyst formed in situ in the solution by separately introducing an organomagnesium compound, a titanium tetrahalide and elemental oxygen, the amount of oxygen being equal to from 12 to 35 mol percent per mol of titanium present.

CROSS-REFERENCE TO RELATED APPLICATION

The copending application of Nudenberg, Goldstein, Rolleri and Delaney, Ser. No. 658,358, filed Aug. 4, 1967, is directed to an essentially linear, random butadiene-styrene copolymer wherein a high proportion of the butadiene units in the polymer molecule are in the cis-configuration and to a process of making such a copolymer.

BACKGROUND OF THE INVENTION

It is well known that butadiene and styrene have pronounced differences in polymerization reactivities. See British Pat. 994,726 to Firestone which discloses the use of a lithium-based catalyst in a process of making true copolymers of butadiene and styrene as opposed to block copolymers and which at p. 3, starting at line 108, points out that oxygen, nitrogen and other components of air as well as oxygenated and nitrogenous organic compounds should be kept out of the reaction zone so as not to inhibit polymerization. French Pat. 1,458,323 and Canadian Pat. 764,540 corresponding thereto, both issued to Bridgestone Tire Company Limited, disclose a process for the production of copolymers of butadiene and styrene or an alkyl styrene having a high proportion of the butadiene in the cis-1,4 configuration by carrying out the polymerization in the presence of a catalyst and a diluent under pressure sufficient to maintain the reaction system in the liquid phase, in an inert atmosphere, the catalyst being obtained by reacting a component A comprising a metallic salt of an organic carboxylic acid or an organic complex of nickel or cobalt, a component B comprising a chloride or oxychloride of titanium, zirconium or vanadium and a component C comprising an organometallic compound of the general formula $R_nM$ in which M is lithium, zinc, cadmium or aluminum, R is a monovalent hydrocarbon radical, and $n$ is the valence of M. Like the first reference, the latter reference emphasizes the importance of carrying out the polymerization in the absence of materials which would undesirably interfere with the polymerization.

SUMMARY OF THE INVENTION

The present invention is a process for preparing a rubbery copolymer of butadiene and styrene wherein at least 50%, and typically at least 80%, of the butadiene units are in the cis-1,4 configuration and which contains from 10 to 45% by weight of bound styrene, this bound styrene having random distribution, which comprises polymerizing monomeric butadiene and monomeric styrene in solution in an inert organic solvent with an iodine-containing catalyst formed in situ in the solution by separately introducing an organomagnesium compound corresponding to a formula selected from the group consisting of RMgX, $R_2Mg$ and mixtures thereof, wherein X is selected from the group consisting of chlorine, iodine, bromine and fluorine and R is a hydrocarbyl radical containing 1–30 carbon atoms, a titanium tetrahalide and elemental oxygen in amount equal to from 12 to 35 mol percent per mol of titanium present.

The principal advantages of using elemental oxygen in accordance with the process of this invention are as follows:

(1) It brings about rapid and continuous incorporation of styrene to produce truly random high cis-SBR.

(2) It greatly shortens the reaction time.

(3) It effects formation of polymers having higher and more controllable molecular weight.

(4) It gives higher yields of copolymer.

(5) It enables the production of copolymers having Mooney values greater than 50 which lend themselves to use with conventional rubber processing methods and equipment.

(6) Rubber stocks compounded with the random high cis-SBR copolymers made by the novel process of this invention exhibit exceedingly high cut growth properties and improved tread wear properties.

(7) The glass transition temperature of the random high cis-SBR copolymers made by the process of the invention is similar to that which is characteristic for rubbery polybutadiene. It was very surprising to find that random high cis-SBR copolymers made by the process of the invention have such a low glass transition temperature which makes the rubber products made therefrom serviceable over a wide temperature range.

DESCRIPTION OF THE PREFERRED EMBODIMENTS

The random copolymers made by the process of our invention possess excellent processing characteristics and readily blend with conventional elastomer compounding ingredients, when mixed in a Banbury mixer or on rubber mills. The physical properties of these materials are characteristic of elastomeric copolymers, but the heat build-up property is lower. The randomly distributed styrene appreciably modifies the characteristics exhibited by cis-1,4-polybutadiene. Our copolymers have Mooney viscosities (ML–4 at 212° F.) ranging from 5 to values in excess of 100 and preferably from 50 to values in excess of 100. Those having Mooney viscosities of between about 50 and 100 are preferred for use as elastomeric materials. These copolymers have an intrinsic viscosity [$\eta$] when measured in toluene solution of between about 1 and 4.

Our random copolymers are made with an iodine-containing catalyst formed in situ by separately incorporating an organomagnesium compound (which is free from ethers which would have a deleterious effect on the reaction although inert ethers such as diphenyl ethers are tolerable), a titanium tetrahalide and elemental oxygen.

The organomagnesium compounds used in the process of this invention correspond to the general formulas RMgX and $R_2Mg$, wherein X is chlorine, iodine, bromine or fluorine, and R is a hydrocarbyl radical containing 1–30 carbon atoms. The titanium tetrahalide component is represented by the general formula $TiX_4$ wherein X is defined as in the organomagnesium compound but may represent the same or combinations of different halogen atoms.

The organomagnesium compounds usable in the process of this invention are exemplified by the following: dodecyl magnesium iodide, dodecyl magnesium bromide, decyl magnesium iodide, stearyl magnesium iodide, ethyl magnesium iodide, methyl magnesium iodide, methyl magnesium chloride, myristyl magnesium bromide, nonyl magnesium iodide, nonyl magnesium fluoride, naphthyl magnesium bromide, phenyl magnesium bromide, phenyl magnesium chloride, ethyl magnesium chloride, hexyl magnesium iodide, 2-ethylhexyl magnesium bromide, methyl cyclohexyl magnesium iodide, p-tertiary butyl benzyl magnesium iodide, hexadecyl magnesium chloride, cetyl magnesium fluoride, didodecyl magnesium, didecyl magnesium, distearyl magnesium, diethyl magnesium, dimethyl magnesium, dimyristyl magnesium, dinonyl magnesium, dinaphthyl magnesium, diphenyl magnesium, dihexyl magnesium, di-2-ethylhexyl magnesium, dimethylcyclohexyl magnesium, di-p-tertiary butyl benzyl magnesium, dihexadecyl magnesium and dicetyl magnesium.

The titanium tetrahalide employed in this invention is exemplified by the following: titanium tetraiodide, titanium tetrabromide, titanium tetrachloride, titanium tetrafluoride and mixed titanium tetrahalides such as titanium dichloride diiodide, titanium dibromide diiodide and titanium monobromide triiodide.

The catalyst used in our invention typically comprises 1.0 to 10 equivalents of organomagnesium compound per mol of titanium tetrahalide, preferably using a ratio of from 2:1 to 5:1. The concentrations of these materials employed in the process of our invention are best expressed in mols, that is, equivalents of organomagnesium compound plus mols of titanium tetrahalide, per mol of butadiene reactant. (Under this formula 1 mol of these catalyst-forming materials=½ equivalent organomagnesium compound+½ mol titanium tetrahalide). The broad concentration range of these materials is between 0.00001 and 0.01 mol per mol of butadiene in the reaction mixture. The preferred concentration range is between 0.00007 mol and 0.0045 mol of these materials per mol of butadiene reactant.

As will be obvious to those skilled in the art the normal precautions should be taken to insure that the solvents, monomers and catalyst components are free from impurities which would interfere with the solution polymerization reactions, especially impurities which would poison the catalyst or slow up the polymerization or objectionably contaminate the polymer product. The styrene and butadiene reactants as well as the inert solvent and the oxygen should be relatively free of moisture, preferably below 10 parts per million. They should also be essentially free from sulfur, carbonyl groups, and peroxides. In addition the monomers can be freed of inhibitors by passing them through an alumina bed prior to adding them to the polymerization reaction.

A requirement of the process of our invention, in order to obtain a copolymer having a high cis content, is that iodine be present in the catalyst system either as elemental iodine or a substituent of the organomagnesium compound or of the titanium tetrahalide. The presence of the iodine in the catalyst system seems to exert a directing influence on the polymerization reaction, as it does when used in the preparation of cis-1,4-polybutadiene, with the result that the butadiene component of the instant copolymers has a cis content of at least 50% and as high as 94%.

In our process the catalyst is formed in situ in the reaction mixture by the separate introduction of the individual catalyst components, that is, the organomagnesium compound, the titanium tetrahalide and the oxygen, to the reaction mixture containing styrene and butadiene. In the process of our invention, the conversion of the active catalyst to an inactive reduced state is substantially eliminated.

The polymerization process of the invention is effected at temperatures of from −10° C. to 150° C. with temperatures between 50° C. and 100° C. being preferred. We generally use a temperature in the neighborhood of 75° C. The polymerization temperature does not appear to be critical. Because of the stability and temperature insensitivity of the catalyst system employed in this process, it is not necessary to maintain rigid control over temperature during the polymerization. In fact, the reaction can be allowed to exotherm adiabatically, in which case the heat liberated augments the rate of reaction. The polymerization process is usually effected at pressures sufficient to maintain a liquid phase operation. Broadly speaking, pressures between atmospheric and 500 p.s.i.g. (pounds per square inch gauge) may be employed; but pressures between 30 and 100 p.s.i.g. are usually adequate to maintain the liquid phase operation.

The inert organic solvent used in the process of our invention is generally a hydrocarbon solvent. Aromatic hydrocarbons such as benzene, toluene or xylene are preferred.

The copolymerization reaction can be effected batchwise or in a continuous manner. The usual reaction time for the polymerizations contemplated in this invention can vary from ½ hour to 3 or more hours with the reaction temperature, the catalyst activity, the solvent, and the size of the polymerization reaction mixture all affecting the duration of the reaction.

In carrying out the process of our invention a typical batchwise procedure involves separately adding the organomagnesium compound and the titanium tetrahalide to the solution of the monomers in the inert solvent incrementally, the elemental oxygen being introduced into the free space of the reaction zone after the first such incremental addition. One such procedure is as follows: Charge the solution of monomers to the reactor at room temperature, add 60% of the organomagnesium compound and the titanium tetrahalide separately to the solution, then introduce all of the oxygen to the vapor phase, stir for a short time, then separately add second increments of the organomagnesium compound and the titanium tetrahalide, heat the reaction mixture to a temperature of 50–100° C., and add the final increment of organomagnesium compound whereby polymerization is initiated, with or without simultaneous addition of a final increment of titanium tetrahalide. Polymerization is then carried out to the desired conversion after which the polymer product is recovered in any conventional manner.

In the practice of our invention the elemental oxygen is usually introduced in any suitable manner directly into the free or vapor space in the reactor. We deem this mode of introduction preferable to bubbling it into the liquid phase through a dip tube.

Our process for preparation of the random high cis-SBR copolymers and their characteristics are further illustrated in the following examples, in which all parts and percentages are by weight unless noted otherwise. All reported percentages of "cis," "trans" and "vinyl" are based on the butadiene portion of the copolymer. In all instances the styrene content was measured by infrared technique, the measurement for block styrene content was determined by nuclear magnetic resonance and the glass transition temperature ($T_g$) was measured by differential thermal analysis.

EXAMPLE 1

This example demonstrates the practice of the oxygen process for the preparation of random cis-SBR using an organomagnesium-titanium tetrahalide catalyst. The 5 gallon reactor used in this experiment was first purged with nitrogen and then charged with 5011 grams of benzene, 1175 grams of butadiene and 7133 grams of styrene, the charge having been treated earlier to remove oxygen and moisture by nitrogen sparging and azeotropic distillation followed by passing the material through a column of H–151 (trademark) (⅛" balls) activated alumina. A total of 79.5 milliequivalents of diphenylmagnesium and 21.0 millimoles of titanium tetraiodide was added to the reactor at different stages. Initially, 47.7 milliequivalents of diphenylmagnesium and 15.7 millimiles of the titanium tetraiodide were added at room temperature (25° C.) quickly, followed by 6.42 millimoles of oxygen. The reaction vessel was then stirred for 5 minutes after which an additional 15.9 milliequivalents of diphenyl magnesium and 5.3 millimoles of titanium tetraiodide were added. The temperature of the reactor was then raised to 75° C. and an additional 15.9 milliequivalents of diphenylmagnesium was added which initiated polymerization.

The characteristics of the copolymer during and after polymerization are presented in Table I.

TABLE I

| Elapsed time (hrs.)[1] | Percent | | | | |
|---|---|---|---|---|---|
| | Solids | Styrene | Cis | Trans | Vinyl |
| .12 | 6.7 | 17.2 | 92.8 | 1.6 | 5.6 |
| .62 | 7.9 | 16.0 | 93.1 | 1.5 | 5.4 |
| 1.10 | 9.6 | 17.1 | 93.1 | 1.6 | 5.3 |
| 1.6 | 9.2 | 19.2 | 92.8 | 1.6 | 5.6 |
| 2.1 | 9.7 | 19.2 | 93.0 | 1.4 | 5.6 |

[1] Refers to the time in hours after polymerization was initiated.

A similar experiment was made, again in a 5 gallon reactor using the same charge of benzene, butadiene and styrene referred to above, in which no oxygen was added. In this reactor run a total of 63.6 milliequivalents of diphenylmagnesium and 21.0 millimoles of titanium tetraiodide was added at two different stages at room temperature. Initially 47.7 milliequivalents of diphenylmagnesium and 15.7 millimoles of titanium tetraiodide catalyst was added, initiating polymerization. Stirring was continued for 5 minutes. At this point, an additional 5.9 milliequivalents of diphenylmagnesium and 5.3 millimoles of titanium tetraiodide was added and the temperature of the reaction vessel was increased to 75° C. The characteristics of the polymer during and at the end of polymerization are presented in Table Ia.

TABLE Ia

| Elapsed time (hrs.)[1] | Percent | | | | |
|---|---|---|---|---|---|
| | Solids | Styrene | Cis | Trans | Vinyl |
| 0.25 | 8.7 | 1.0 | 94.1 | 1.4 | 3.5 |
| 0.75 | 8.7 | 1.6 | 93.6 | 1.5 | 3.3 |
| 1.25 | 8.8 | 1.9 | 93.8 | 1.3 | 3.0 |

[1] Refers to the time in hours after polymerization was initiated.

In comparing the data shown in Table I obtained by our oxygen process with the data in Table Ia it can be readily seen that in our oxygen process styrene is readily incorporated into the polymer after polymerization is initiated; the measured $T_g$ shows the absence of polystyrene formation and no styrene blocks were present as determined by nuclear magnetic resonance. In the absence of oxygen butadiene polymerized rapidly with very little styrene being incorporated. The low level of styrene was there as blocks or homopolystyrene.

EXAMPLE 2

This example shows that as the level of oxygen is increased the amount of styrene is increased in a randomized cis-SBR polymer. Three five gall reactors were used and each charged with 5527 grams benzene, 1305 grams butadiene and 7304 grams styrene. A total of 79.5 milliequivalents of diphenylmagnesium and 26.4 millimoles of titanium tetraiodide catalyst was added at three different stages similar to the procedure used in Example 1. In each case the oxygen was added directly after the first addition of catalyst. Reaction was allowed to proceed for a total of 1.5 hours at which time the charge was emptied into another vessel equipped with stirrer and containing shortstop consisting of methanol and diethyl amine as well as an antioxidant (2,6 di-t-butyl-4-methylphenol—sold under the trademark of "Ionol" by Shell Chemical Co.). The polymer was then flocced in isopropyl alcohol and dried in a vacuum oven at 60° C. The data on the three runs and the physical characteristics of the polymer obtained in the three runs are given in Table II below.

TABLE II

| Run | A | B | C |
|---|---|---|---|
| Diphenylmagnesium (milliequivalents) | 79.5 | 79.5 | 79.5 |
| $TiI_4$ (millimoles) | 26.4 | 26.4 | 26.4 |
| Oxygen (millimoles) | 6.4 | 7.3 | 8.6 |
| Mol percent $O_2$/mm. Ti | 24.2 | 27.6 | 32.6 |
| Percent conversion | 97 | 97 | 52 |
| Percent styrene | 12 | 15 | 42 |
| Percent block styrene | 0 | 0 | 0 |
| Mooney viscosity (ML-4 at 212° F.) | 58 | 88 | 9.5 |
| $T_g$, ° C. | −105 | −106 | −107 |
| Intrinsic viscosity | 2.13 | 2.63 | 1.18 |
| Percent gel (toluene-insoluble) | 2.7 | 1.7 | 1.6 |

It is also evident from the above table that when 8.6 millimoles of $O_2$ is introduced into the reaction additional catalyst is required to achieve high conversion as shown in runs A and B.

EXAMPLE 3

This example is similar to run A in Example 2 except the final charged catalyst ratio of milliequivalents of diphenylmagnesium to millimoles of titanium tetraiodide is 3.8 to 1 rather than 3.0 to 1 with 6.4 millimoles of oxygen as was the case in run A of Example 2. Here again the same charge of benzene butadiene and styrene was used as in the preceding example. However, the polymerization was initiated in this case after the third addition of only diphenylmagnesium and no titanium tetraiodide. The physical characteristics of the high cis-SBR polymer produced in this run are presented in Table III below— the total polymerization time being 1.5 hours.

TABLE III

| Run: | D |
|---|---|
| Diphenylmagnesium (milliequivalents) | 79.5 |
| $TiI_4$ (millimoles) | 21.0 |
| Oxygen (millimoles) | 6.4 |
| Percent cis | 90.5 |
| Percent trans | 1.7 |
| Percent vinyl | 7.9 |
| Percent styrene | 12.8 |
| Percent block styrene | 0 |
| $T_g$, ° C. | −105 |
| Intrinsic viscosity | 4.5 |
| Mooney viscosity (ML-4 at 212° F.) | 62 |
| Percent gel | 2.3 |

EXAMPLE 4

This example also demonstrates the preparation of highly randomized high cis-SBR. Again the same charge of benzene, butadiene and styrene was used in a 5 gallon reactor as shown in run A of Example 2 as well as the same amount of oxygen and catalyst. The oxygen (6.4 millimoles) was added directly after the first catalyst addition; i.e. 47.7 milliequivalents of diphenylmagnesium and 15.75 millimoles of $TiI_4$. The stirred reactor was then heated to 70° C. and the second catalyst addition was made, i.e. 15.9 milliequivalents of diphenylmagnesium and 5.25 millimoles of TiI$_4$. Twenty minutes later a third addition of catalyst components (similar to the second addition) was made and the reaction initiated. After approximately 1½ hours after polymerization was initiated the charge in the reactor was transferred to a stirred vessel containing shortstop consisting of 17 grams of "Ionol," 10 grams of methyl alcohol and 12 grams of diethyl amine. The polymer was flocced in isopropyl alcohol and dried in a vacuum oven at 60° C. The randomized high cis-SBR polymer showed the following physical characteristics.

TABLE IV

| Run: | E |
|---|---|
| Diphenylmagnesium (milliequivalents) | 79.5 |
| TiI$_4$ (millimoles) | 26.4 |
| Oxygen (millimoles) | 6.4 |
| Percent cis | 89.5 |
| Percent trans | 4.7 |
| Percent vinyl | 5.9 |
| Percent styrene | 18.0 |
| T$_g$, ° C. | −107 |
| Percent block styrene | 0 |
| Mooney viscosity (ML–4 at 212° F.) | 120 |
| Percent gel | 0.3 |

EXAMPLE 5

This example demonstrates that the highly randomized high cis-SBR polymer produced in Example 4 by our oxygen process with an organomagnesium/tetrahalide catalyst and compounded in a typical tread stock recipe has outstanding resistance to tear, lower heat build-up, significantly better wear resistance and cold temperature properties and superior cut growth resistance when compared with similarly compounded emulsion polymerized SBR ("Synpol 1712" (trademark), high cis-BR, mixtures of cis-BR and polystyrene 85/15, and a 50/50 mixture of cis-BR and emulsion polymerized SBR ("Synpol 1712") stocks. The compounding details and the physical test data are presented in the table below.

The formulations used in compounding each stock were as follows:

TABLE V

| Stock feature | Cis-SBR[1] | "Synpol 1712"[2] | Cis-BR | Cis-BR/polystyrene 85/15 | Cis-BR/"Synpol 1712" 50/50 |
|---|---|---|---|---|---|
| Polymer | 100 | 138 | 100 | 100 | 100 |
| Flexzone 3C[3] (trademark) | 1.0 | 1.0 | 1.0 | 1.0 | 1.0 |
| ISAF Black[4] | 70.0 | 70.0 | 70.0 | 70.0 | 70.0 |
| Sundex 790[5] (trademark) | 38.0 | | 38.0 | 38.0 | 19.0 |
| Zinc oxide | 3.0 | 3.0 | 3.0 | 3.0 | 3.0 |
| Stearic acid | 2.0 | 2.0 | 2.0 | 2.0 | 2.0 |
| Sunproof (trademark) Wax | 0.5 | 0.5 | 0.5 | 0.5 | 0.5 |
| CBS[6] | 1.3 | 1.3 | 1.3 | 1.3 | 1.3 |
| DPG[7] | 0.1 | 0.1 | 0.1 | 0.1 | 0.1 |
| Sulfur | 1.75 | 1.75 | 1.75 | 17.5 | 1.75 |

[1] Polymer prepared according to Example 4.
[2] Oil-extended Emulsion SBR produced by Texas-U.S. Chemical Co.
[3] N-isopropyl-N′-phenyl p-phenylenediamine (antiozonant).
[4] Intermediate Super Abrasion furnace Black produced by Continental Carbon Co.
[5] Produced by Sun Oil Co., ASTM D-2226, Type 102, viscosity SUS at 100° F. is 3,000,-Aromatic type oil.
[6] N-cyclohexyl-2-benzothiazolesulfenamide (accelerator).
[7] Diphenyl guanidine (accelerator).

The physical properties of the respective stocks are shown in Table Va below.

TABLE Va

| | Cis-SBR | "Synpol 1712" | Cis-BR | Cis-BR/polystyrene 85/15 | Cis-BR "Synpo 1712" 50/5 |
|---|---|---|---|---|---|
| Cpd. ML–4, 212° F. | 78 | 59 | 88 | 90 | 65 |
| Percent styrene | 18 | 23 | | 15 | 12 |
| Cure time, min. at 293° F. | 20 | 35 | 20 | 20 | 30 |
| Log R[1] | 4.57 | 3.82 | 3.72 | 3.47 | 3.36 |
| Shore A hardness | 62 | 55 | 54 | 64 | 55 |
| R.T. tensile, p.s.i. | 2,660 | 3,200 | 2,150 | 1,980 | 2,700 |
| Percent elong. | 580 | 630 | 560 | 470 | 500 |
| S–300 | 865 | 805 | 700 | 975 | 780 |
| 212° F. tensile, p.s.i. | 1,220 | 1,550 | 1,170 | 1,610 | 1,500 |
| Percent elong. | 500 | 490 | 500 | 540 | 510 |
| 250° F. tear, #/0.1″ | 12.2 | 7.3 | 9.2 | 10.2 | 8.9 |
| R.T. rebound, percent | 33 | 24 | 42 | 36 | 31 |
| 250° F. tor. hysteresis | .130 | .186 | .158 | .185 | .139 |
| 42° F. Goodrich flex Δ° F. | 39 | 55 | 47 | 58 | 53 |
| Stat. def., percent | 15 | 20 | 16 | 16 | 18 |
| Dyn. drift, percent | 2.3 | 4.6 | 4.2 | 8 | 2 |
| Perm. set, percent | 4.5 | 10.6 | 7.2 | 9.6 | 6.4 |
| Gehman low temp. stiffness: | | | | | |
| T$_2$,° C | −7.7 | −11 | −48. | −34.7 | −20. |
| T$_5$,° C | −47.0 | −30 | | −63.5 | −45. |
| T$_{10}$,° C | −64.0 | −37 | | | −53 |
| T$_{100}$,° C | | −42 | | | −69 |
| Abrasion resistance | 196 | 84 | 246 | 111 | 161 |
| 150° F. cut growth, kc./in. | 3,200 | 69 | 133 | 336 | 64 |

[1] Resistivity ohm-cm.

EXAMPLE 6

This example shows a series of bottle experiments which were made to demonstrate the effect of adding increasing amounts of oxygen to a diphenylmagnesium-titanium tetraiodide catalyst system. To the dry inert gas flushed bottles were charged the monomers and solvent followed by the addition of catalyst at room temperature in two stages. Use of the two shot catalyst addition with the oxygen being added after the first addition prevented gel formation, increased yield and maintained a high rate of styrene incorporation. The remainder of the catalyst was added after agitating for 5 minutes. Then the temperature was raised to 70° C. at which time polymerization was initiated. Polymerization was carried out for 2 hours. The following table presents the data on each bottle experiment and the percent styrene obtained in the final polymer.

TABLE VI

| Run Number | F | G | H | J | K | L |
|---|---|---|---|---|---|---|
| Benzene | 70 | 70 | 70 | 70 | 70 | 70 |
| Styrene | 30 | 30 | 30 | 30 | 30 | 30 |
| Butadiene | 20 | 20 | 20 | 20 | 20 | 20 |
| Diphenylmagnesium, me.[1] | 1.17 | 1.17 | 1.17 | 1.17 | 1.17 | 1.17 |
| TiI$_4$, mM[2] | .468 | .468 | .468 | .468 | .468 | .468 |
| O$_2$ ml at 25° C. and 769 mm. Hg | 0 | 0.5 | 1 | 2 | 4 | 8 |
| O$_2$ mM | | .02 | .04 | .08 | .16 | .32 |
| Mole percent O$_2$/mM. Ti | | 4.5 | 9.0 | 18.0 | 36 | 72 |
| Percent styrene | 0.5 | 1.0 | 1.0 | 15 | 30 | 35 |

[1] Milliequivalents.  [2] Millimoles.

The results show that a high styrene content copolymer is readily prepared provided that about 12 mol percent of oxygen/millimole of Ti is present.

The physical properties of the random high cis-SBR copolymers made by this invention and having Mooney viscosities (ML–4 at 212° F.) of 50 or higher have useful applications in making tires and other rubber products such as hose, conveyor belting, V-belts, positive drive belts, molded rubber products, fabric-rubber containers, etc.

As many embodiments of this invention may be made without departing from the spirit and scope thereof, it is to be understood that the invention includes all such modifications and variations as come within the scope of the appended claims.

Having thus described our invention, what we claim and desire to protect by Letters Patent is:

1. A process for preparing a rubbery copolymer of butadiene and styrene wherein at least 50% of the butadiene units are in the cis-1,4 configuration and which contains from 10 to 45% by weight of bound styrene, said bound styrene having random distribution, which comprises polymerizing monomeric butadiene and monomeric styrene in solution in an inert organic solvent with an iodine-containing catalyst formed in situ in said solution by separately introducing an organomagnesium compound corresponding to a formula selected from the group consisting of RMgX, $R_2Mg$ and mixtures thereof, wherein X is selected from the group consisting of chlorine, iodine, bromine and fluorine and R is a hydrocarbyl radical containing 1–30 carbon atoms, a titanium tetrahalide and elemental oxygen in amount equal to from 12 to 35 mol percent per mol of titanium present.

2. The process of claim 1 wherein said organomagnesium compound is diphenylmagnesium and wherein said titanium tetrahalide is titanium tetraiodide.

3. The process of claim 1 wherein said organomagnesium compound and said titanium tetrahalide are used in an equivalent:mol ratio of 1:1 to 10:1.

4. The process of claim 2 wherein said diphenylmagnesium and said titanium tetraiodide are used in an equivalent:mol ratio of 2:1 to 5:1.

5. The process of claim 1 wherein said organomagnesium compound and said titanium tetrahalide are added incrementally and wherein the elemental oxygen is introduced after the first increments thereof.

6. The process of claim 2 wherein the diphenylmagnesium and the titanium tetraiodide are added incrementally, the oxygen is introduced after the introduction of the first incremental portions of the diphenylmagnesium and titanium tetraiodide, second incremental portions of diphenylmagnesium and titanium tetraiodide are then introduced, the reaction mixture is then heated to a temperature of from 50 to 100° C., and a third incremental portion of the diphenylmagnesium is then introduced to initiate polymerization.

References Cited
UNITED STATES PATENTS

| | | | |
|---|---|---|---|
| 3,317,492 | 5/1967 | Hochwalt | 260—79.5 |
| 3,642,759 | 2/1972 | Bodnar et al. | 260—94.3 |

FOREIGN PATENTS

| | | | |
|---|---|---|---|
| 917,096 | 1/1963 | Great Britain | 260—94.3 |

JOSEPH S. SCHOFER, Primary Examiner

W. F. HAMROCK, Assistant Examiner

U.S. Cl. X.R.

252—430; 260—94.3; 880 R